(12) United States Patent
Ohmori

(10) Patent No.: US 6,728,377 B1
(45) Date of Patent: Apr. 27, 2004

(54) CODING APPARATUS AND AN INFORMATION PROCESSING APPARATUS PROVIDED WITH THE CODING APPARATUS

(75) Inventor: Masatake Ohmori, Zama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/349,770

(22) Filed: Jul. 9, 1999

(30) Foreign Application Priority Data

Jul. 9, 1998 (JP) .......................................... 10-210403
Nov. 20, 1998 (JP) .......................................... 10-347844

(51) Int. Cl.$^7$ ................................................. H04N 1/44
(52) U.S. Cl. ....................................................... 380/243
(58) Field of Search ................................ 380/243, 246, 380/210, 217; 382/232, 247

(56) References Cited

U.S. PATENT DOCUMENTS 4,891,643 A * 1/1990 Mitchell et al. ............ 341/107
6,122,379 A * 9/2000 Barbir ......................... 380/269

* cited by examiner

Primary Examiner—Matthew Smithers
(74) Attorney, Agent, or Firm—Oblon, Spivak, McClelland, Maier & Neustadt, P.C.

(57) ABSTRACT

A coding apparatus includes an arithmetic coding medium as a specified information setting medium and an information processing apparatus provided with the above coding apparatus. The coding apparatus can obtain a high confidentiality and practice an arithmetic coding method without losing high-speed performance in order to realize the method. The coding apparatus provided with the arithmetic coding medium includes a state memory for storing a reference address for addressing a probability table into respective addresses addressed by data extracted by a model template and a probability table previously storing different appearance probabilities in the respective addresses. The specified information is previously written in a specified information memory. When the coding operation is started, an initializing medium reads out the specified information from the specified information memory, obtains the initial address frown the specified information, and sets the initial address to the state memory as the initial address of the reference address.

68 Claims, 13 Drawing Sheets

| INPUT ADDRESS | REFERENCE TABLE ADDRESS |
|:---:|:---:|
| 0 | $A_0$ |
| 1 | $A_1$ |
| " | " |
| " | " |
| " | " |
| " | " |
| 1022 | $A_{1022}$ |
| 1023 | $A_{1023}$ |

*FIG. 3*

CODING APPARATUS AND AN INFORMATION PROCESSING APPARATUS PROVIDED WITH THE CODING APPARATUS

BACKGROUND OF THE INVENTION

1. Field of the Invention

The present invention relates to a coding apparatus including an arithmetic coding medium for use in a facsimile device, an image storing apparatus, and the like. In particular, the present invention relates to a coding apparatus capable of securing the confidentiality of transmitted image information, and an information processing apparatus provided with the coding apparatus.

2. Discussion of the Background Art

There are background systems for confidentially transmitting information, for example with a facsimile machine. If the contents of information have to be made confidential for a third party at the time of communicating binary-value image data, in one system only a person capable of inputting a password in a confidential personal communication mode can usually output the data, for instance, in a facsimile device. Or otherwise, in consideration of the communication being intercepted or monitored by the third party, the image can be scrambled, i.e. encrypted, and thereby the output image cannot be discriminated without being decrypted. However, if high confidentiality is required to be obtained, the scrambling algorithm becomes complicated. As a result, the speed of processing may be lowered. The above-mentioned matter of the background art is a problem to be solved.

The communication apparatus as disclosed in the published specification of Japanese Laid-open patent publication No. 8-107,506/1996 has already provided a confidentiality technology relating to a progressive mode among the JBIG (Joint Bi-level Image Experts Group) system prescribed in JISX4311: ISO/IEC11544 which is an international standard of the binary-image coding method. The progressive mode is a coding method of stepwisely restoring an image at a time of decoding the image from a low-resolution image to a high-resolution image. However, in order to solve the above-mentioned problems, an encryption processing is practiced only for the lowest-resolution layer in the JBIG system.

When the image of a one-step higher resolution is restored, unless the encrypted layer of the lowest resolution is changed to a plain text or descrambled or decrypted by adopting the method of referring to the restored image on the layer of the one-step lower resolution, the image of the one-step higher resolution layer cannot be restored.

As to the tier type coding method of the binary image, the JBIG algorithm is further described. As seen in the rapidly and widely spread popularization of the facsimile device etc., almost all parts of a business document include binary-value information of black-and-white. Regarding the methods of effectively coding such binary-value information, the methods of Modified Huffman (MH), Modified READ (Relative Element Address Designate) (MR), and Modified-Modified READ (MMR) have already been standardized, and practically applied to G3 and G4 facsimile devices.

Such coding methods are established by estimating the hard copy represented, for instance, by the facsimile device. The methods are premised on the so-called sequential build-up of scanning the paper document surface from left to right and from top to bottom and performing the coding operation in the above order. According to these methods, at the receiving side, the received information can be decoded without storing any information recorded on the paper surface immediately. For this reason, such methods can be suitably adopted to a facsimile device.

On the other hand, in addition to the diversification of the image communication, there has been further proposed a progressive build-up which is capable of promptly transmitting an entire image even in the case of a rough or poor image quality, and which is further capable of adding additional image information as occasion demands, and thereby improving the image quality.

In the case of restoring the image of one-step higher resolution, a one-grade higher resolution layer cannot be restored if the encrypted lowest-resolution layer cannot be decrypted, by adopting the method of referring to the restoring image of the one-step-lower resolution.

Heretofore, the background art regarding the communication apparatus is described. However, according to such background art which is disclosed in the background-art documents, e.g., the published specification of Japanese Laid-open Patent Publication No. 8-107,506/1996, and other relevant documents, etc., there exists no advantageous functional effect.

To state in more detail, the published specification of Japanese Patent Publication No. 8-107,506 regarding a communication apparatus describes a method of maintaining confidentiality with respect to the progressive mode (the coding method of stepwisely restoring the image from the low resolution to the high resolution at the time of decoding) among the JBIG (Joint Bi-level Image experts Group) method (JISX4311:ISO/IEC11544) which is an international standard of the binary image coding method.

In the above-mentioned communication apparatus, the encryption processing is executed for the lowest-resolution layer in the JBIG method. At the time of decoding, the processing is advanced referring to the restored image of the lowest-resolution layer, and the image of the one-step higher resolution is restored. Therefore, if the lowest-resolution layer is encrypted, the next-stage resolution layer cannot be correctly decoded unless the cryptogram is changed to a plaintext, namely, decrypted.

Furthermore, as to the high-resolution layer of the subsequent stage, the resolution of the preceding stage image is referenced. Consequently, if the preceding stage image cannot be decrypted, it turns out to become impossible to correctly reproduce the image in the processing performed thereafter. In such a way, the confidentiality of the image can be accomplished.

For instance, when the JBIG method is employed in the facsimile device, a sequential mode (the mode of reproducing the image in order from the top to the bottom side at the time of decoding) is used instead of the aforementioned progressive mode.

On this occasion, since the image is not constructed with such a tier-type image structure, the entire area of the data after coding becomes the object to be encrypted. For this reason, if the amount of the data to be coded is too much, the time required for processing of changing the cryptogram to the plaintext and vice versa (encrypting and decrypting) is also increased on some occasions. Furthermore, the above-mentioned background art document Japanese Laid-open Patent Publication No. 8-107,506 regarding the aforementioned communication apparatus does not describe at all the algorithm of performing the encrypting operation.

SUMMARY OF THE INVENTION

On the other hand, the present invention aims at providing a novel data coding apparatus capable of enhancing confidentiality with a high speed.

The present invention was made in order to solve the above-mentioned and other problems in the background art. Accordingly, it is an object of the present invention to solve the background-art defects such as noted in the above-mentioned problems.

It is another object of the present invention to provide a novel coding apparatus capable of solving the background-art defects and thereby obtaining high confidentiality.

It is still another object of the present invention to provide a novel coding apparatus capable of obtaining the functional effect of obtaining a high-speed operation even in the case of not including plural resolution layers.

It is still another object of the present invention to provide a novel information processing apparatus provided with the above-mentioned coding apparatus and further including a specified information setting medium.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3 is a data construction diagram in the coding apparatus of the first embodiment according to the present invention;

DETAILED DESCRIPTION OF THE PREFERRED EMBODIMENTS

Figure 1A:
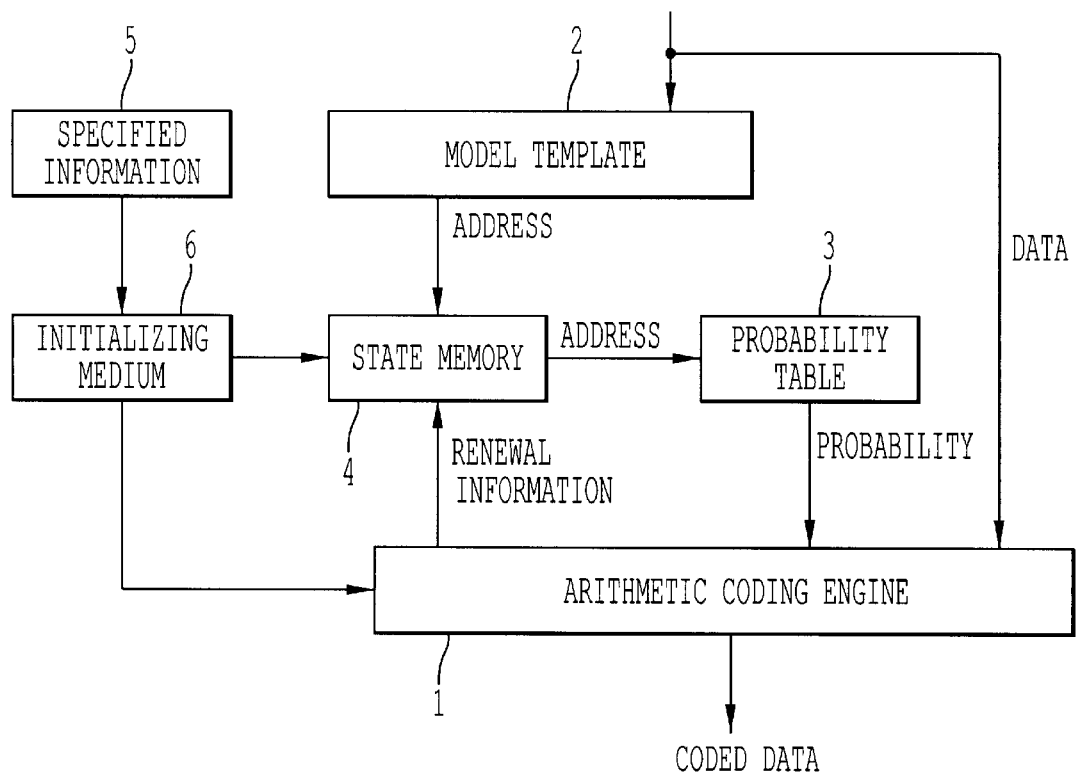
FIG. 1A and FIG. 1B are structural block diagrams of the coding and decoding apparatus illustrating a first embodiment according to the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIGS. 1, 6, 7, 8, and 9 thereof, there are illustrated a coding apparatus, a decoding apparatus, and an information processing apparatus which can further include a specified information setting medium, of the present invention.

Figure 12:
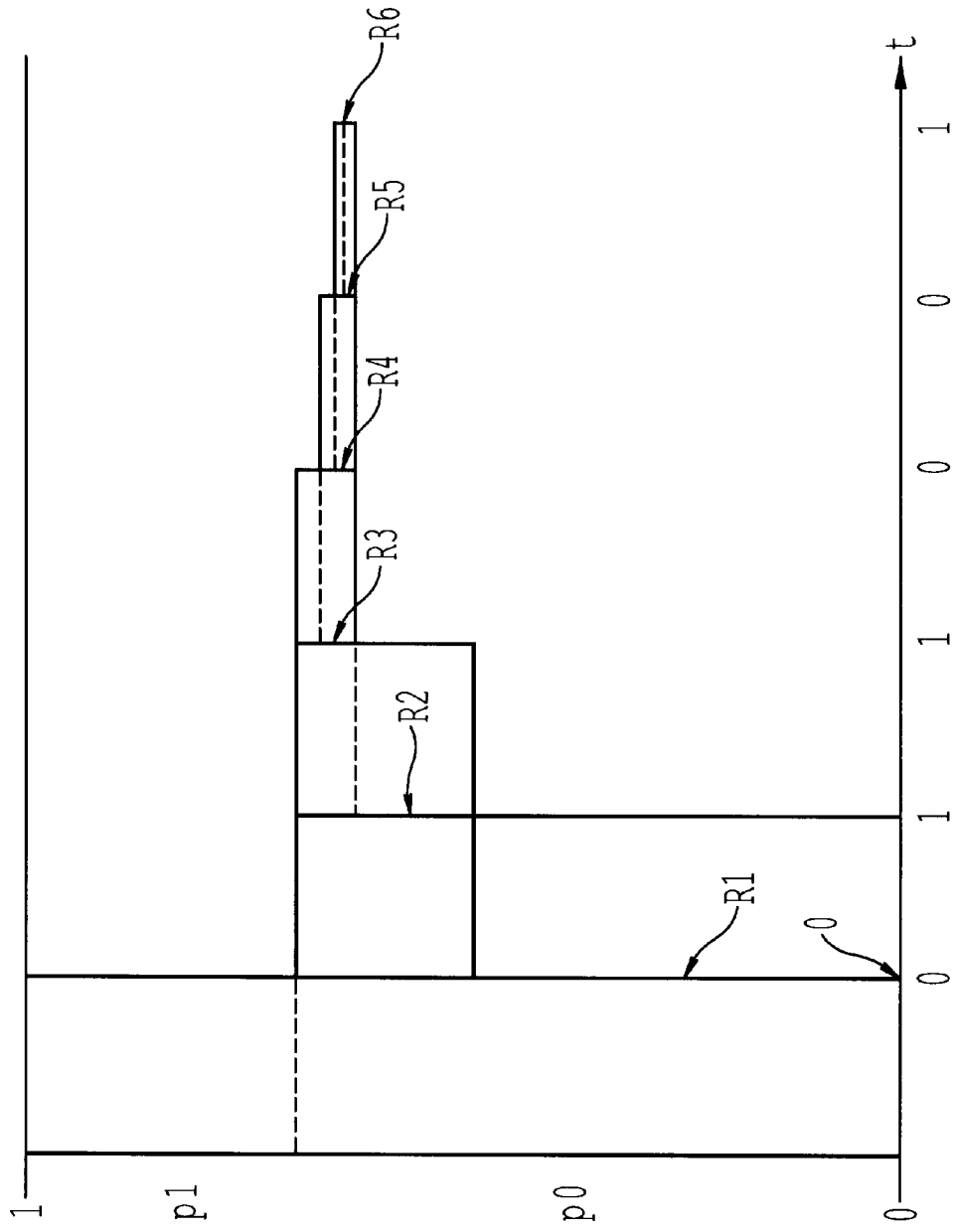
FIG. 12 is an explanatory diagram for explaining an arithmetic coding method in relation to the present invention.

First, the method of the arithmetic coding in relation to the present invention is explained hereinafter. The coding method is a method of expressing a series of symbols in a stream as positional information on a straight line and coding the information thus expressed by mapping the above-mentioned symbol stream (for instance, binary-value image data row) on a straight line from 0 to 1. For instance, as shown in FIG. 12, the symbol stream "011001" is mapped on the straight line from 0 to 1 as the area R6. The width of the area is shown by a solid line.

Namely, the symbol stream composed of only "0" is mapped in the area R1, and the other symbol streams "01", "011", "0110", "01100", and "011001" are respectively mapped in the areas R2, R3, R4, R5, and R6.

Regarding the above-mentioned symbol stream, the higher the appearance probability of the symbol stream corresponding to the area size, the larger the area size to be mapped and the smaller the bit number of the code representing the area. Consequently, the longer the symbol stream becomes, the larger the amount of information in the symbol stream becomes.

However, since it is allowable that the information amount showing the position, i.e., area, after coding corresponding thereto is very small if the appearance probability of the above-mentioned symbol stream is high, the amount of the information obtained in the coding operation is compressed. Moreover, as shown in FIG. 12, the widths of the respective areas correspond to the appearance probabilities of the respective symbol streams. The symbols p1 and p0 shown in FIG. 12 respectively represent the appearance probabilities of the symbol streams "1" and "0".

Figure 10:
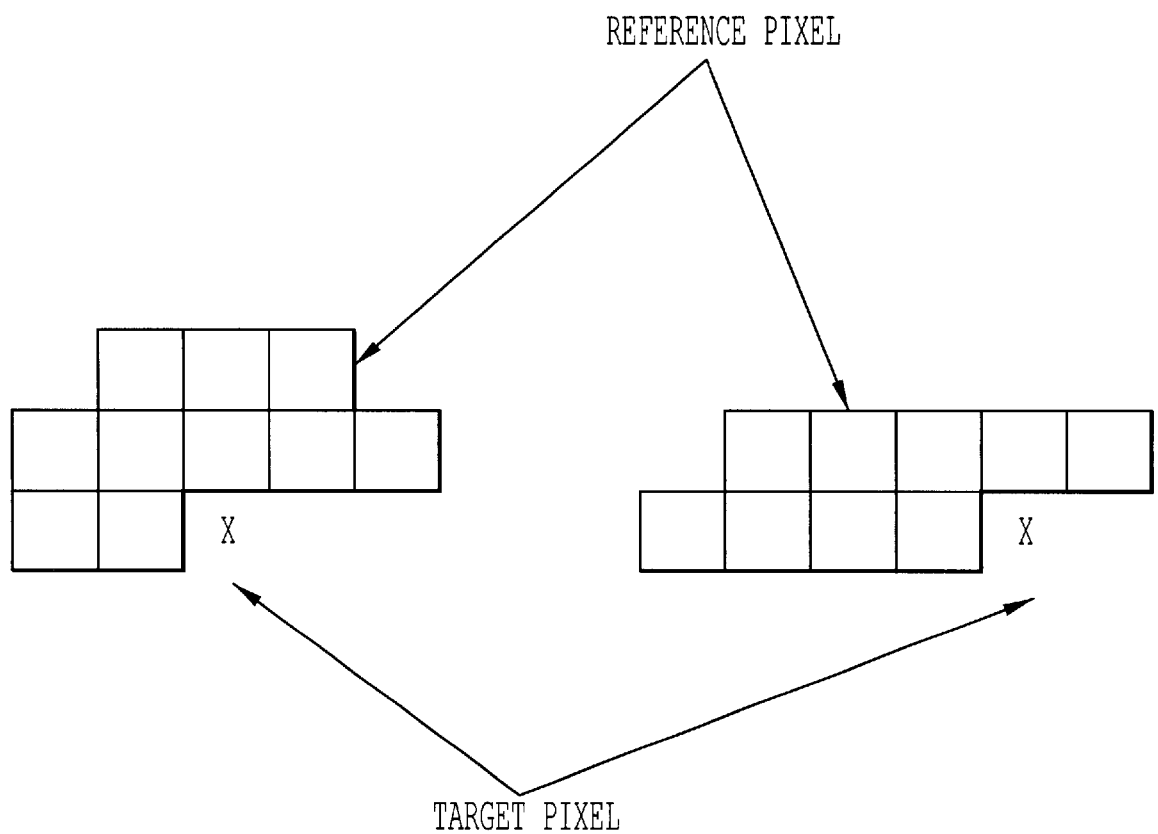
FIG. 10 is an outlined explanatory diagram for explaining a model template employed in a coding apparatus of the present invention.

FIG. 10 is an outlined explanatory diagram for explaining a model template employed in a coding apparatus of the present invention. Generally, in the model template shown in FIG. 10, the respective adjacent blank square areas represent "reference pixels", and the other areas marked with "X" represent "target pixels".

Employing the model template as shown in FIG. 10, the image data value of the target pixel marked with "X" is estimated from the data of the pixels in the circumference of the target pixel. For instance, there exists an employed method of performing a preceding processing operation by use of the information of the difference between the above-mentioned estimated image data value and the actual image data value. In such a method as mentioned above, if the estimation is correct, "1" appears successively (in the case of "1" without any difference), or "0" appears successively, or approximately a similar symbol system appears. Thereby, the appearance probability thereof becomes high regardless of the long symbol system. Consequently, when the arithmetic coding operation is performed thereafter, the compressing rate is further improved, compared with the case of practicing the coding operation without performing any preceding processing operation as mentioned above.

Figure 11:
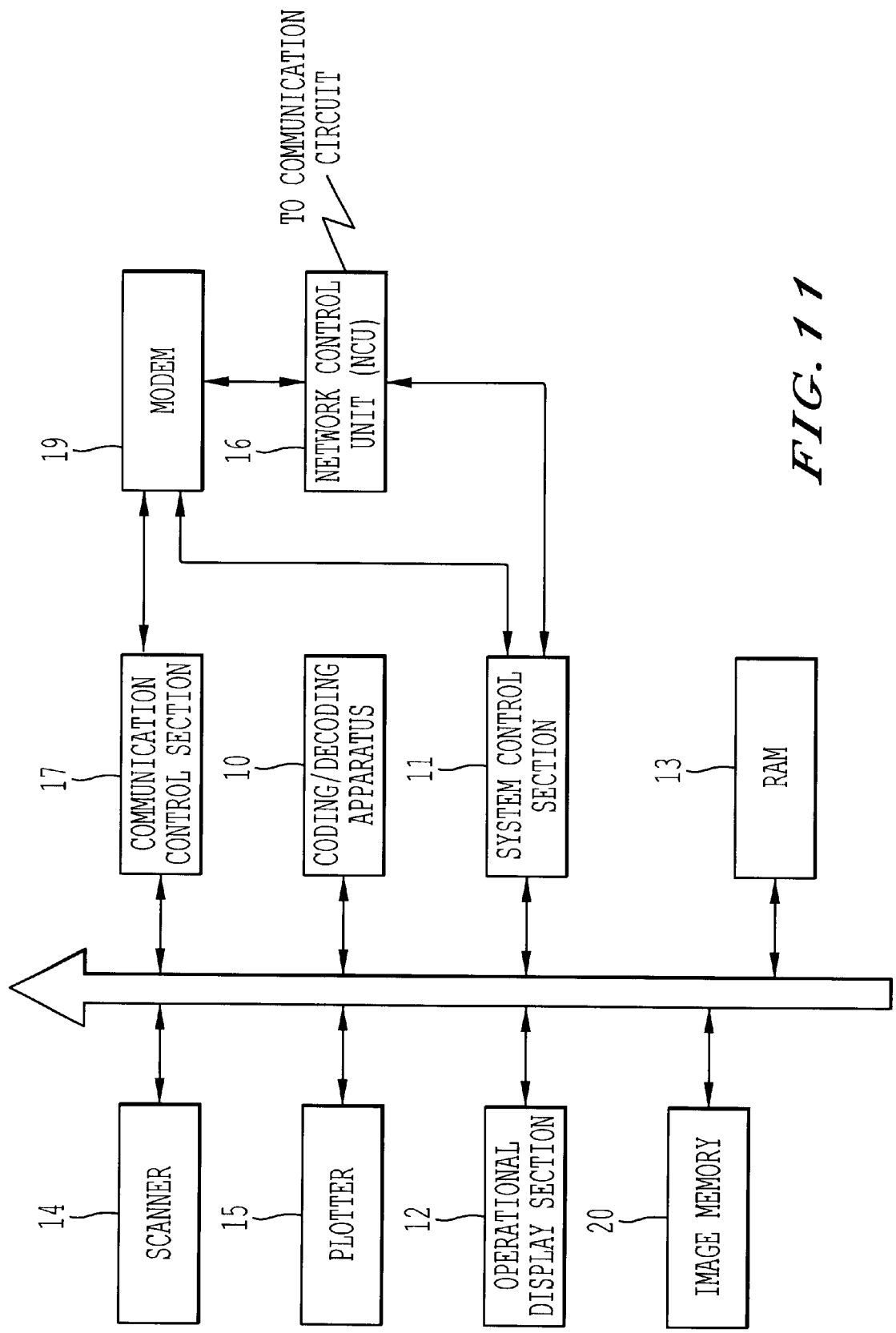
FIG. 11 is a structural block diagram of a facsimile device illustrating an embodiment of the information processing apparatus provided with the coding apparatus according to the present invention.

FIG. 11 is a structural block diagram, for instance, of a facsimile device serving as an information processing apparatus in the present invention.

As shown in FIG. 11, the facsimile device of the present invention is composed of a coding/decoding apparatus 10 for coding transmitted image information and for decoding received image information. A system control section 11 includes a ROM (not shown) having therein a program and a CPU operating in accordance with the above-mentioned program for administrating and controlling the overall apparatus. An operation displaying section 12 is composed of a keyboard for giving an instruction or a command from the user to the facsimile device and a display medium for giving messages from the facsimile device to the user. A RAM 13 temporarily stores the image information, etc. A scanner 14 reads out the image on the original document. A plotter 15 outputs the decoded received image onto recording paper. A network control unit (NCU) 16 sets the "calling" between the facsimile device and another remote facsimile device through the public telephone network. A communication control section 17 performs facsimile transmitting/receiving operations in accordance with, e.g., the G3 transmission controlling procedure. A MODEM 19 can be composed of a low-speed MODEM and a high-speed MODEM, and an image memory 20 stores image information.

Finally, as to the embodiments according to the present invention, the general features thereof in construction and operation are described hereinafter, in addition to the matters mentioned heretofore.

A probability table internal to an arithmetic coding medium is constructed with a RAM. A non-standard value is down-loaded by an initializing medium. At the time of a normal communication, the value in accordance with the standard state is down-loaded. At the decoding side, when a non-standard table, which is the same as that of the coding side, is not used, the image cannot be reproduced. For this reason, the initial desired object can be attained.

It is allowable to use a non-standard probability table constructed such that all of the non-standard probability tables differ from the standard probability table in construction and in operation. However, implementing such a construction exerts an influence upon the coding efficiency, i.e. the compression ratio. Namely, a random numerical value cannot be compressed. If the value is necessarily used at the initial coding time in the case of the arithmetic coding, that is, a part of the numerical value near the probability of 0.5 is changed in the area not largely deviating from the probability of 0.5, it is possible to effectively create the non-standard table.

First Embodiment

Figure 1B:
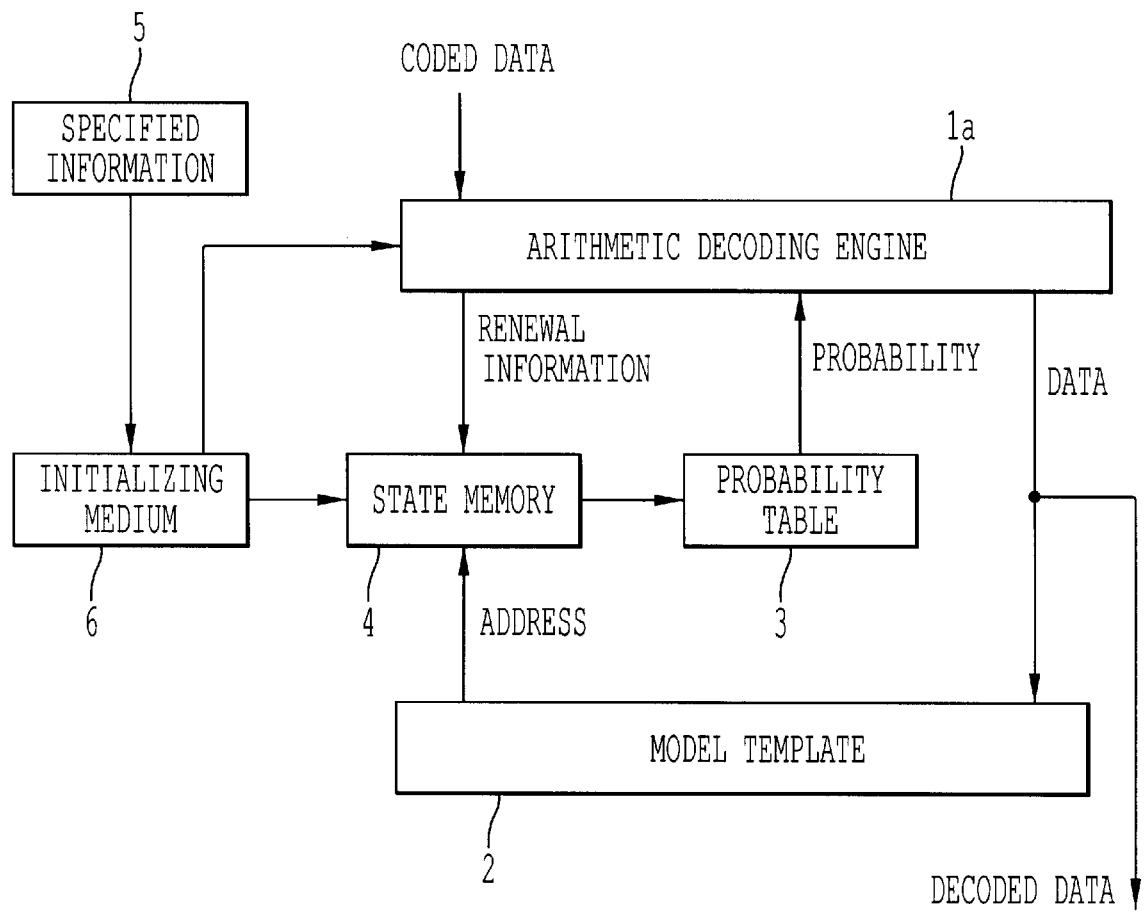

FIGS. 1A and 1B are structural block diagrams of the coding and decoding apparatus 10 illustrating the first embodiment of the present invention. The arrow marks in FIG. 1A represent the data flow at the time of coding, while the arrow marks in FIG. 1B represent the data flow at the time of decoding.

As shown in FIGS. 1A and 1B, the coding apparatus of the first embodiment is composed of an arithmetic coding engine 1 performing an arithmetic coding operation, an arithmetic decoding engine 1a, a model template 2, a probability table 3 for obtaining respective appearance probabilities of combination data which are probably extracted by the above-mentioned model template 2, a state memory 4 performing address conversion in accordance with specified information, a specified information memory 5 storing specified information, and an initializing medium 6 which obtains an initial value on the basis of the above-mentioned specified information and which sets the above initial value thus obtained into the state memory 4, etc. Furthermore, the above-mentioned specified information is a not-disclosed key information, for instance an ASCII code row. The probability tables and the specified information memory 5 are respectively constructed with, for instance, a ROM, etc.

Figure 2:
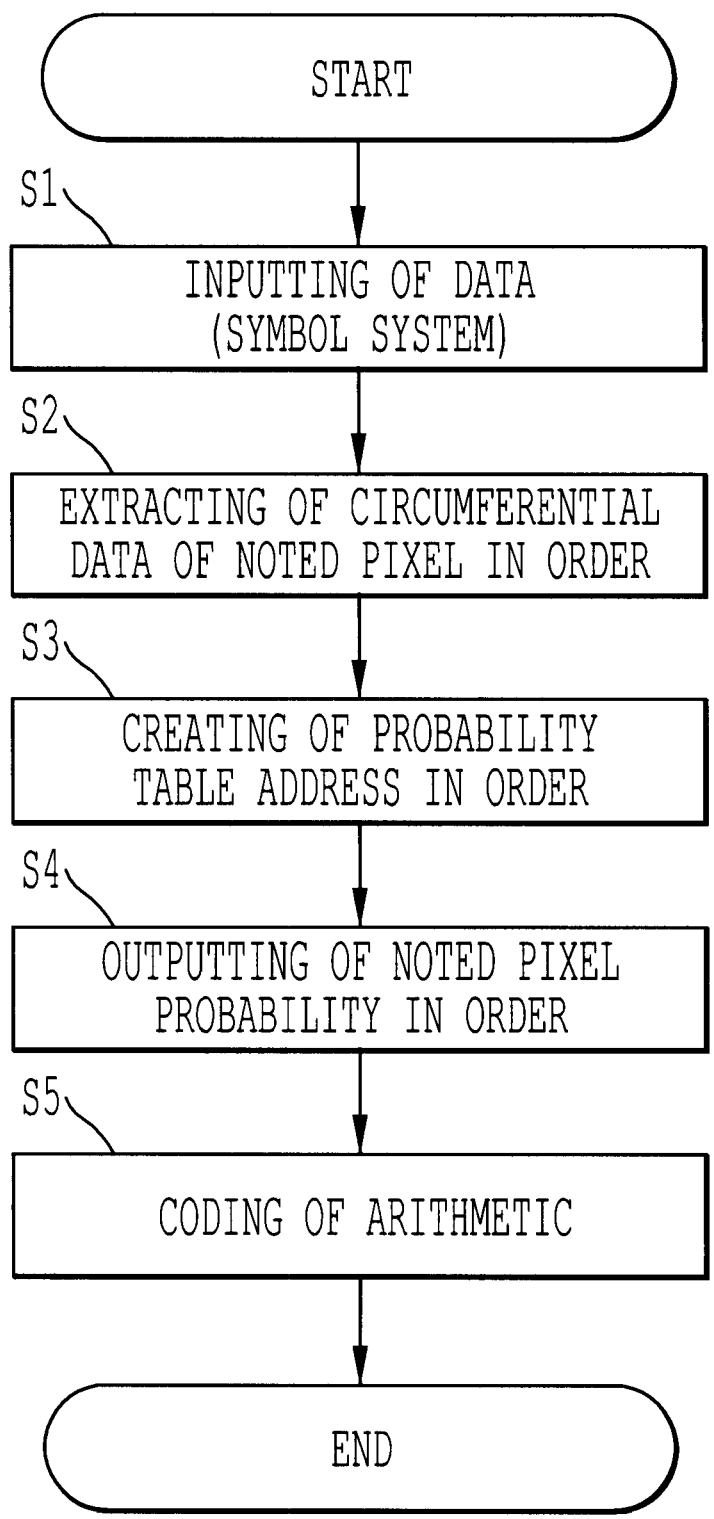
FIG. 2 is an operational flowchart of a coding operation of the first embodiment according to the present invention.

FIG. 2 illustrates an operational flow of the first embodiment at the time of coding. The operation of the first embodiment at the time of coding is described hereinafter in detail, referring to FIGS. 1 and 2.

At first, the bit row, i.e., symbol stream, of the binary value image data input from the scanner 14 is applied to the coding apparatus 10 by the system control section 11 (step S1), see FIG. 11. The respective bits in the above-mentioned bits row are binary-value image data of the respective pixels.

The coding apparatus 10 performs the coding operation in the order from the image data of the first pixel on the first line. Namely, the value of the target pixel is estimated from the image data in the circumference of the preceding target pixel, and then the circumferential data of the respective target pixels are extracted in order by the model template 2 (step S2).

The aforementioned circumferential data are applied to the state memory 4 as the address value, and the state memory 4 is addressed in accordance with the above-mentioned address value. The state memory 4 is constructed with, for instance, a RAM, and as shown in FIG. 3.

When the circumferential data are of 10-bits, since there exists 1,024 different data values, i.e. data states, the input addresses applied to the state memory 4 may also become 1,024 different data values as shown in FIG. 3.

Furthermore, the respective reference addresses of the probability table 3 in which the appearance probability is stored are set in the respective addresses of the state memory 4.

On the other hand, in the background-art technology, for instance, the value "0.5" as the appearance probability is set in the address "0" in the probability table 3, and the value is set in the initial reference address of the probability tables corresponding to the respective input addresses in the state memory 4. However, in the embodiment of the present invention, the initial value, i.e., the initial address, of the reference address for addressing the probability table 3 is made equal to the value in accordance with the previously set specified information. For instance, the specified ASCII code row is previously set as the specified information. The initializing medium 6 reads out the above-mentioned ASCII code, adds the respective bits, and sets the lower-column four bits obtained as the result into the state memory 4 as the initial value, i.e., the initial address, of the respective reference addresses.

The address conversion is practiced through such state memory 4, and the address for addressing in order the probability table 3 is created corresponding to the target pixel (step S3), and the appearance probability stored in the address is output or read out (step S4). Furthermore, since the initial address firstly output from the state memory 4 is not equal to 0, a value different from 0.5 is read out as the first appearance probability.

When the appearance probability read out from the probability table 3 showing the probability in which the data of the noted pixel becomes, for instance, equal to 1 and is applied to the arithmetic coding engine 1, the arithmetic coding engine 1 estimates that the above-mentioned target pixel data becomes equal to 1 when the above appearance probability is equal to or greater than 0.5. The arithmetic coding engine 1 compares the estimated data value "1" with the actual value of the above-mentioned target pixel directly delivered from the system control section 11. When there exists no difference therebetween, the arithmetic coding engine 1 sets the target pixel data to "1" as the coded value. When there exists some difference therebetween, the arithmetic coding engine 1 sets the target pixel data to "0" as the coded value.

In such ways, if there exists no difference in the plural target pixels to be coded in order, the target pixel data of the bit rows converted in such a way may become symbol streams of successively appearing "1" or occasionally appearing "0". Consequently, those symbol streams are mapped on the numeral straight line and coded to the code of small bits number. In such a way, the data can be compressed (step S5). In the state memory 4 shown in FIG. 3, the arithmetic coding engine 1 renews the reference address in a predetermined rule in accordance with the appearance frequency of "1" and the appearance frequency of "0" corresponding to the respective input addresses, although the above matter is not shown in FIG. 3.

Next, the operation of the coding apparatus of the embodiment at the time of decoding is described hereinafter, in detail, referring to FIG. 1 and FIG. 4.

Figure 4:
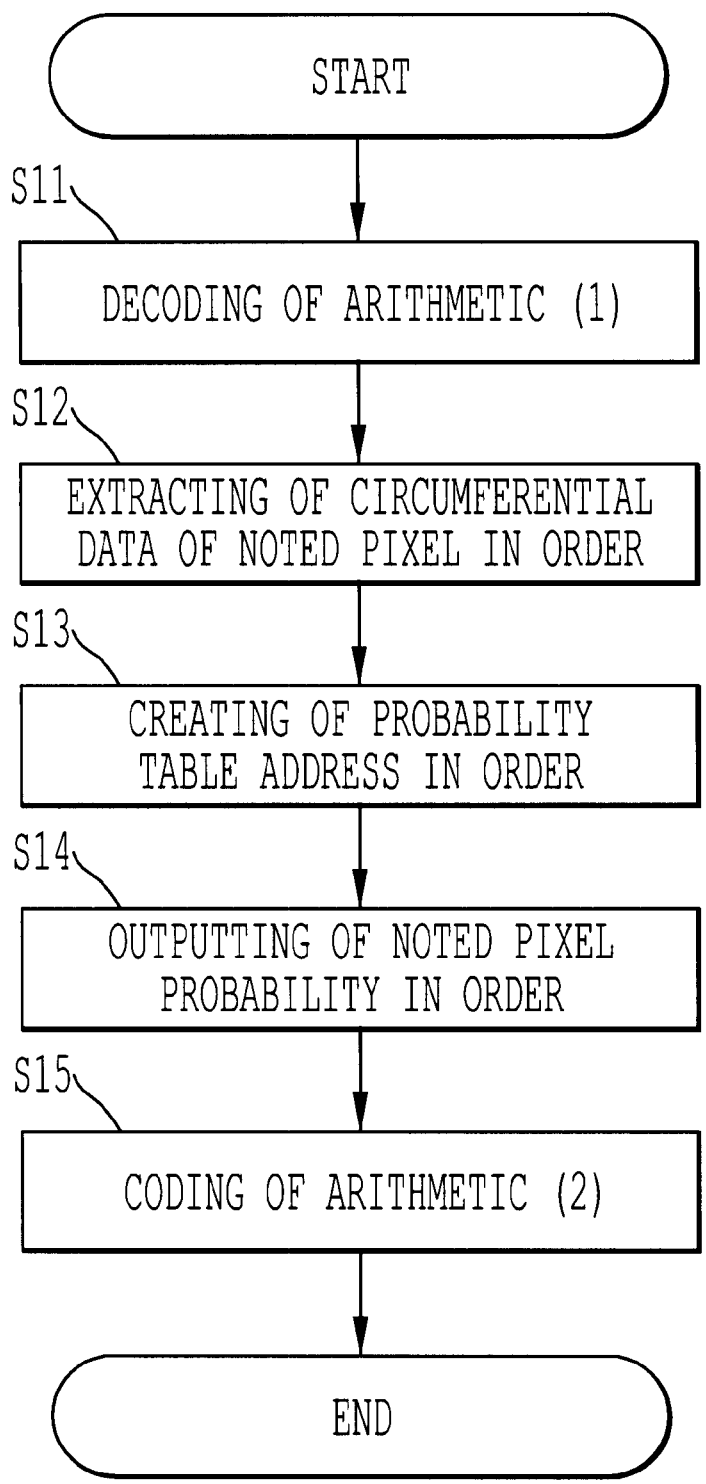
FIG. 4 is another operational flowchart of a coding operation of the first embodiment according to the present invention.

As shown in FIG. 4, at first the arithmetic decoding engine 1a performs the first arithmetic decoding operation at the time of decoding (step S11). The coded data mapped on the numeral straight line are decoded to a long symbol stream. Furthermore, if the previous processing by use of the model template 2 is practiced, for instance at the time of coding, the circumferential data of the target pixel is extracted by use of the model template 2 (step S12). In such a way, the second decoding operation is executed.

As a result, the above-mentioned circumferential data are applied to the state memory 4 as the address value. The state memory 4 is addressed by the above address value. The state memory is constructed, for instance, as shown in FIG. 3.

Furthermore, the address for addressing the probability table 3 in which the appearance probability is stored set to the respective addresses in the state memory 4. In the background-art technology, for instance, the value "0.5" is set to the address 0 in the probability table 3 as the appearance probability, and the initial addresses of the probability table 3 corresponding to the respective input addresses of the state memory 4 are set to the value "0". However, in the embodiment of the present invention, as in the case of the aforementioned coding side, for instance, the specified ASCII code row is previously set to the specified information memory 5 as the specified information, and the initializing medium 6 reads out the above-mentioned ASCII code at the time of starting the communication, adds the respective bits, and sets the lower-column four bits obtained as the result to the state memory 4 as the respective initial addresses, i.e., initial values, of the probability table 3.

The address conversion is practiced through the state memory 4. The address for addressing the probability table 3 is created corresponding to the target pixel (step S13), and the appearance probability stored in the address is output therefrom (step S14). Furthermore, since the initial address firstly output from the state memory 4 is not 0, a value different from 0.5 is read out as the first appearance probability.

However, in the probability table 3, the contents at the coding side are also the same as the contents at the decoding side, and the initial address of the state memory initialized by use of the specialized information is also the same as that at the coding side. Therefore, the value of the read-out appearance probability becomes equal to the value of the appearance probability regarding the target pixel on the same position at the coding side.

Following the above steps, when the appearance probability output from the probability table 3 is equal to or greater than 0.5, the arithmetic decoding engine 1 a estimates that the data of the above-mentioned target pixel may be equal to "1". On the contrary, when the appearance probability is less than 0.5, the arithmetic decoding engine 1a estimates that the data may be equal to "0".

If the actual value of the above-mentioned target pixel in the symbol stream obtained by the decoding operation in the step S11 is equal to the value "1" representing the nonexistence of a difference therebetween, the above-mentioned estimated value is made equal to the decoded data. On the contrary, if the actual value of the target pixel is equal to the value "0" representing the existence of a difference therebetween, the inverted value of the above estimated value is made equal to the decoded data (step S15). Namely, when the estimated value is "1", the decoded data may become "0", and when the estimated value is "0", the decoded data may become "1".

Furthermore, the above-mentioned decoded data are delivered to the system control section 11. At the same time, the data are also delivered to the model template 2 as the preceding circumferential data.

The reference address in the state memory 4 as shown in FIG. 3 is renewed such that the actual appearance probability can be reflected as in the case of the coding side. Namely, an operational calculation is executed for the initial value, i.e., the initial address, set by the initializing medium 6 in accordance with the predetermined rule. In such a way, the above-mentioned address is renewed. The above fact signifies that, even though the renewal of the reference address is practiced based on the learning, if the target pixel is situated on the same position both at the coding side and at the decoding side, the coding operation and the decoding operation can be practiced with the same appearance probability on all positions. As a result, the data before coding becomes equal to the data after decoding.

On the contrary, if the above-mentioned initial values, i.e. initial addresses, differ from each other at the coding side and at the decoding side, even though the address is renewed by the same operational calculation both at the coding side and at the decoding side, the initial values differ from each other. Namely, the reference address is renewed such that the reference address represents the address of the probability table having the same value as the actual appearance probability of the symbol stream. As a result, the renewed addresses also differ from each other. Consequently, the appearance probabilities for the target pixels on the same position do not coincide with each other not only at the initial time but after the renewal time, and therefore the data cannot be decoded to the former data. Namely, at the decoding side, at the image information receiving side for instance, in a facsimile device, unless the coding apparatus according to the first embodiment its employed, it is impossible to perform the interception or monitoring of the communication. Thereby, high confidentiality can be obtained. Furthermore, in the case of providing plural resolution layers, instead of the fact that the encryption in the area excluding the lowest resolution layer is not unnecessary, since the encryption is unconditionally unnecessary, there arises no fear that the high speed in operating the apparatus is lost in order to obtain the high confidentiality.

In the embodiment mentioned above, at the time of setting the initial address, the initializing medium 6 can set not only one initial address but plural initial addresses corresponding to the input addresses applied by the model template 2. For instance, when the circumferential data further close to the target pixel are "1", the initial address is set so as to increase the appearance probability of "1", and when the same circumferential data are "0", the initial address is set so as to decrease the appearance probability of "1".

In such a way as mentioned above, not only can the data compressing rate be improved, but reading-out of the initial address by a third party may become difficult, and thus the confidentiality can be further improved. Moreover, the plural initial addresses can be created, for instance, by adding a predetermined value to the initial address, i.e., the initial value, created as mentioned above or by subtracting the predetermined value from the initial address.

It is also allowable to practice the aforementioned initialization in another way, for instance per stripe or block. To state this more concretely, a block can be set to 128 lines, and the initialization, i.e., initial address setting, as mentioned above can be practiced per block of 128 lines both at the coding side and at the decoding side. In such an embodiment, although the data compressing rate is lowered, the confidentiality can be improved. Therefore, the apparatus of the embodiment is very flexible to taking the confidentiality into serious consideration.

Hereupon, in the arithmetic coding system, the operation of dividing the numeral straight line is repeated in accordance with the symbol stream as mentioned before. On that occasion, the area thus divided corresponds to the above-mentioned symbol stream, and the value corresponding to the above area may become the coded data. The arithmetic coding engine is provided with an area size register referred to as the "A" (Augend) register. The area size obtained as a result of the operational calculation is set to the above-mentioned register. In general, the value of 10000h is set to the "A" register as the initial value. Thereafter, the operational calculation is successively practiced for the above-mentioned initial value in accordance with the created symbol stream.

Second Embodiment

Figure 5:
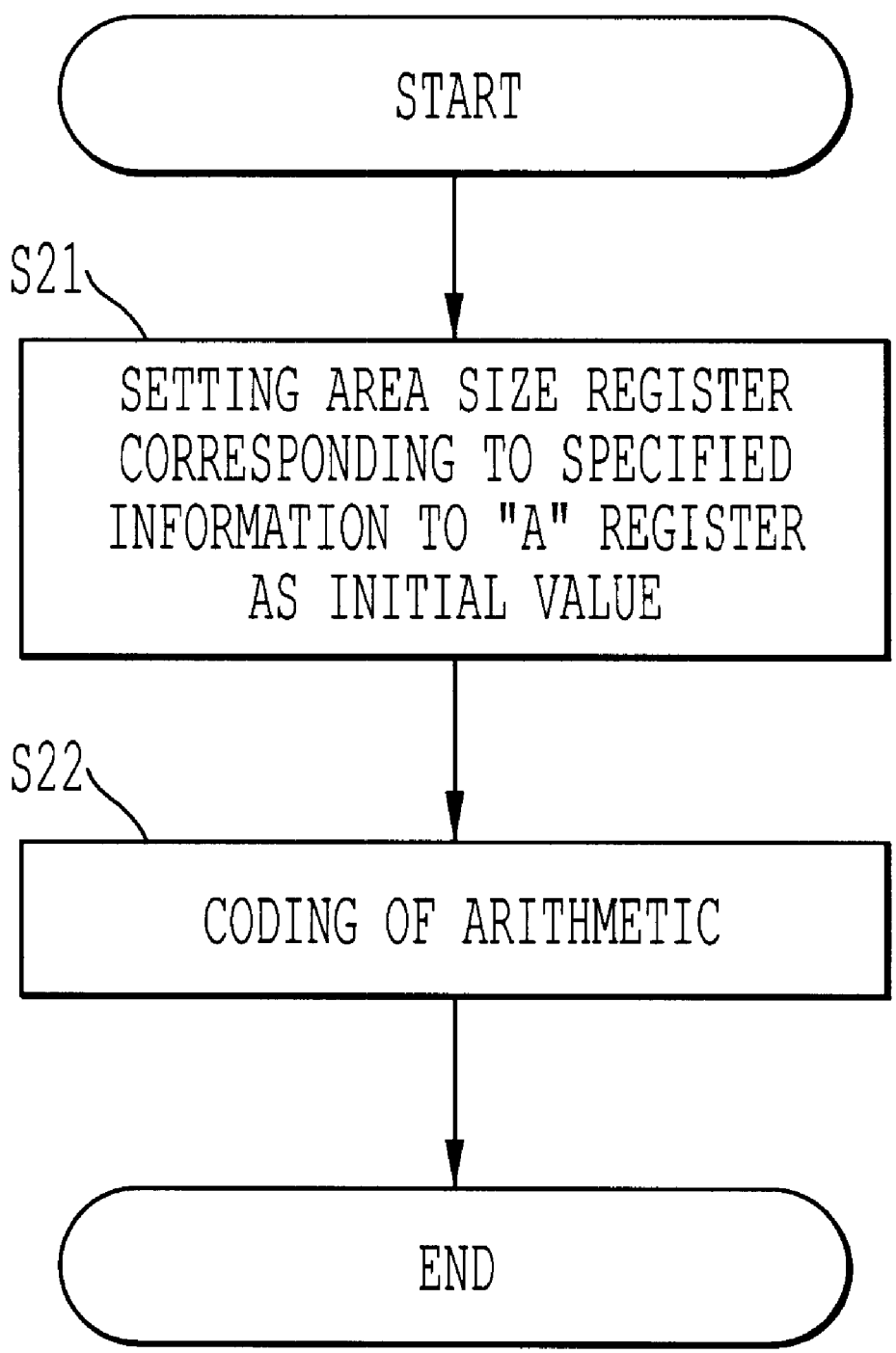
FIG. 5 is an operational flowchart of the coding operation of a second embodiment according to the present invention.

A second embodiment according to the present invention is described hereinafter. FIG. 5 illustrates the operational flow of the second embodiment at the time of coding. In the embodiment, the initializing medium 6 does not set the value "10000h". Instead, the initializing medium 6 sets the value of the specified information previously set in the specified information memory 5 or that of the processed information thereof as the initial value (step S21).

Namely, in the first embodiment, the initial value set by the initializing medium 6 is the initial address for addressing the probability table 3. In the second embodiment, the value of the area size register is the initial value.

Thereafter, when the coding operation is started, the arithmetic coding engine 1 practices the operational calculation for the initial value previously set to the A register in accordance with the created symbol system (step S22).

On the other hand, if the area size register value which is the same as that at the coding side is set to the decoding side as the initial value, the symbol stream data corresponding to the received coding data are decoded on the basis of the above-mentioned initial value. However, if an initial value different from that of the coding side, for instance the value of 10000h, is previously set as the initial value, the symbol stream which is different from the former previous symbol stream is created unexpectedly.

In such a way, the same functional effect as that of the first embodiment can be realized also in the second embodiment.

Third Embodiment

Figure 6:
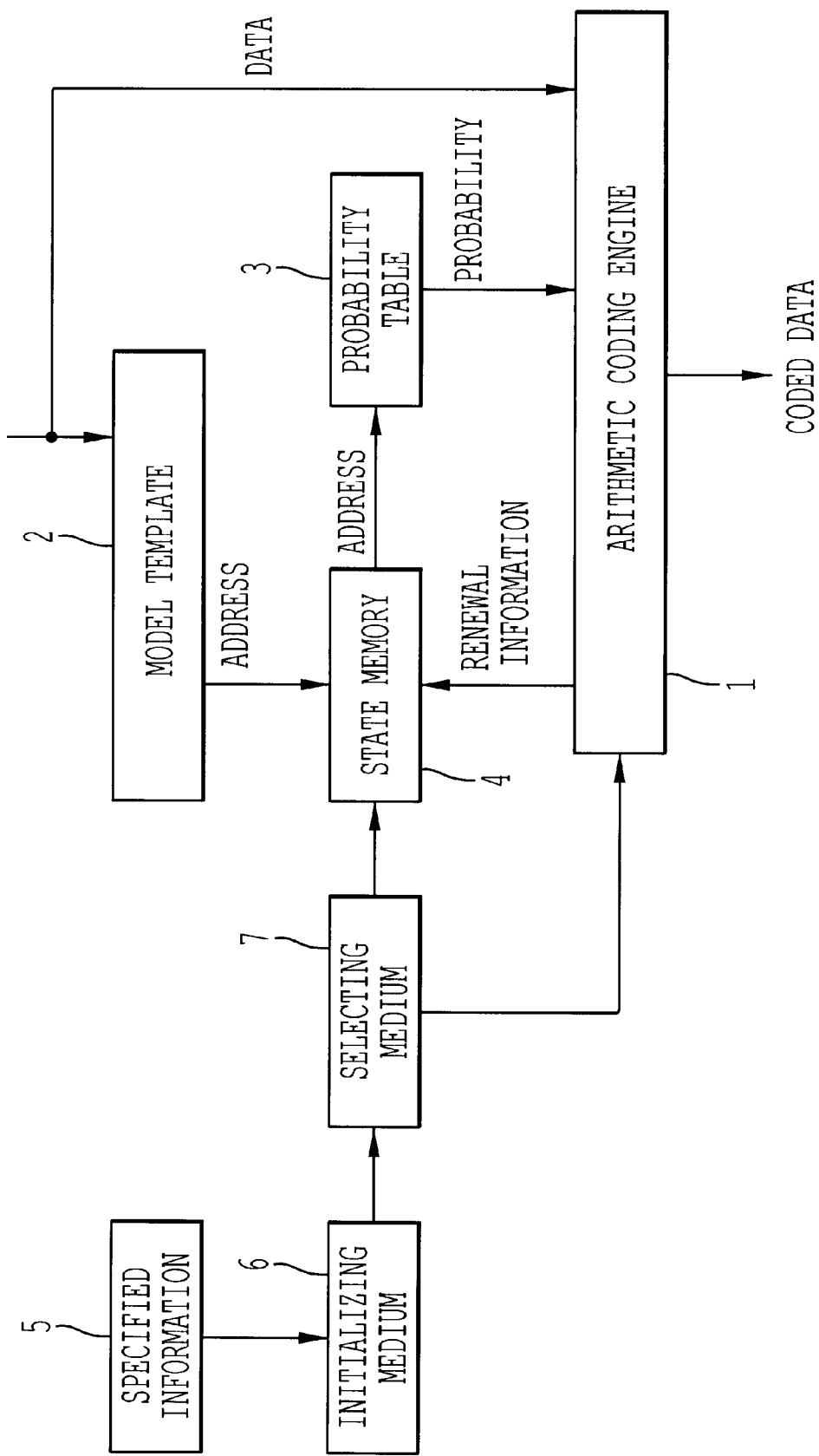
FIG. 6 is a structural block diagram of the coding apparatus of a third embodiment according to the present invention.

A third embodiment of the present invention is described hereinafter. FIG. 6 is a structural block diagram illustrating the coding apparatus of the third embodiment.

As shown in FIG. 6, the coding apparatus of the third embodiment is further provided with a selecting medium 7 in addition to the structural elements of the first embodiment as shown in FIG. 1. The selecting medium 7 can select one of the initial address for addressing the probability table 3, the register value of the area size in the arithmetic coding, or both of them, as the initial value set by the initializing medium 6.

Namely, in the third embodiment, when the initializing medium 6 controls the selection medium 7, and thereby the initial address for addressing the probability table 3 is set as the initial value, the apparatus of the third embodiment operates in the same way as that of the first embodiment as discussed above with reference to FIGS. 2 through 4. Furthermore, when the initializing medium 6 controls the selection medium 7, and thereby the area size register value in the arithmetic coding is set as the initial value, the apparatus of the third embodiment operates in the same way as that of the second embodiment as discussed above with reference to FIG. 5. Furthermore, if both of the initial address for addressing the probability table 3 and the area size register value in the arithmetic coding are set as the initial value, the addressing of the probability table 3 is practiced in the same way as that of the first embodiment. The value of the "A" register becomes the same value as that of the second embodiment.

In such a way, according to the third embodiment, a most suitable confidentialization method can be selected in accordance with the circumstances. In addition, it is also possible to further improve the confidentiality by practicing two different initialization operations as needed.

Fourth Embodiment

Figure 7:
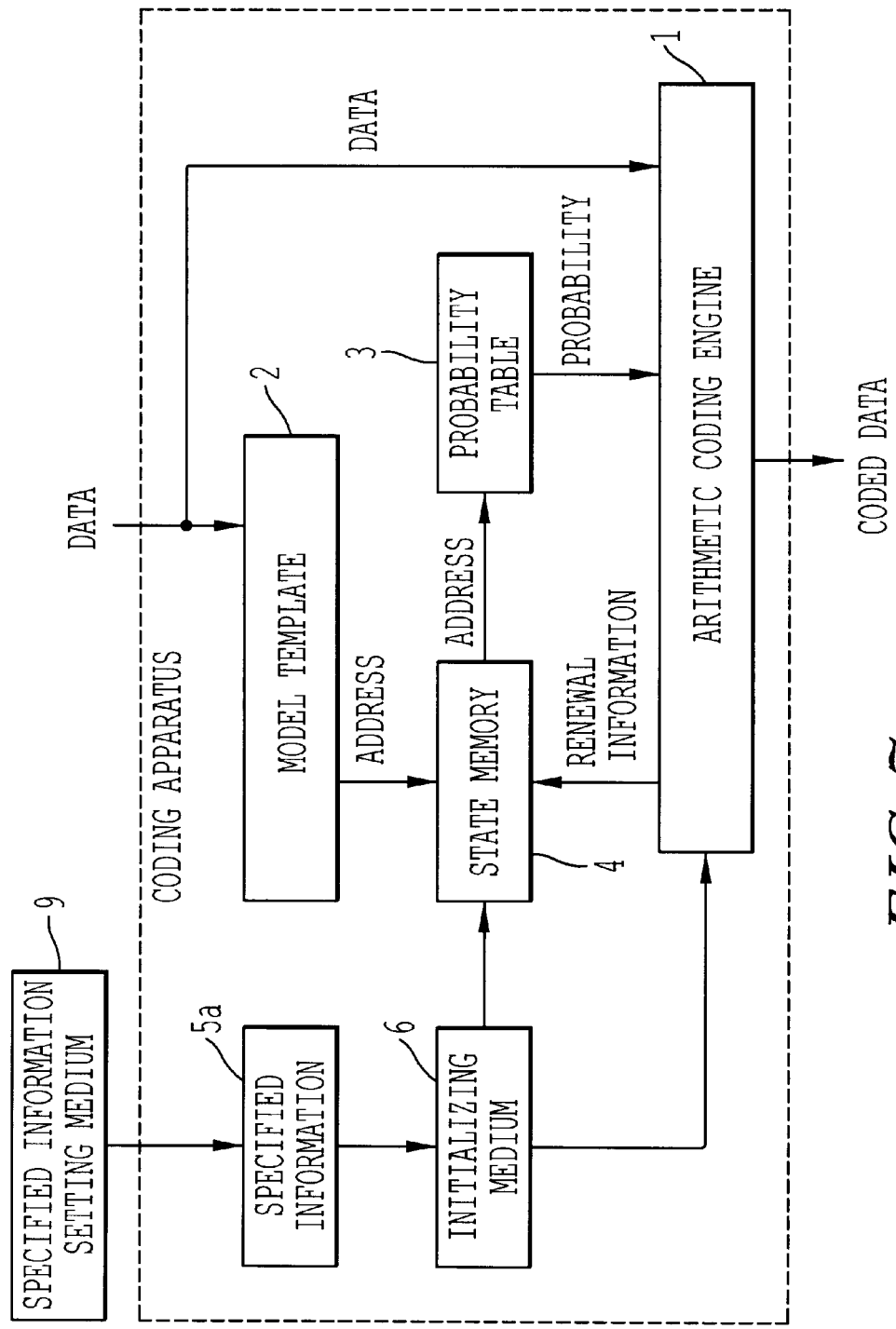
FIG. 7 is a structural block diagram of the coding apparatus of a fourth embodiment according to the present invention.

A fourth embodiment of the present invention is described hereinafter. FIG. 7 is a structural block diagram illustrating a coding apparatus 10 of the fourth embodiment.

As shown in FIG. 7, the coding apparatus of the fourth embodiment is further provided with a specified information setting medium 9 in addition to the structural elements of the first embodiment as shown in FIG. 1. A specified information memory 5a included in the above coding apparatus 10 in FIG. 7 is constructed with a memory, a RAM, etc. The specified information setting medium 9 is constructed with a system control section 11 and an operation displaying section 12, for instance when the information apparatus provided with the above-mentioned coding/decoding apparatus 10 is the facsimile device as shown in FIG. 11.

Using the apparatus with such a structure, the user inputs specified information, such as a password, by use of the specified information setting medium 9 prior to the coding and decoding operations. Thereafter, the system control section 11 acquires the above-mentioned specified information and sets the information thus acquired to the specified information memory 5a. The operation subsequent thereto is the same as that of the first embodiment.

In such a way, according to the fourth embodiment, since only the operator who knows the correct specified information, such as a correct password, can set the correct specified information, the confidentiality can be further improved.

Hereupon, the initial value previously set in the arithmetic coding apparatus exerts an influence upon the data compressing ratio, i.e., the coding efficiency. In particular, if the appearance probability read out by the initial address for addressing the probability table 3 is greatly different from the actual appearance probability, the number of the steps until the time of approaching the actual appearance probability by the effect of learning may be increased, and the fact result in the coding operation of poor efficiency, i.e., of a low data compressing rate, during that time period, and thereby the amount of the code turns out to be increased inevitably. For instance, if the coding apparatus is employed for an ordinary document, when the setting is done as if the occurrence rate of black is high even though the occurrence rate of white is overwhelmingly high, a large number of steps are required for advancing the learning until the state of high occurrence rate of white is obtained.

Fifth Embodiment

Figure 8:
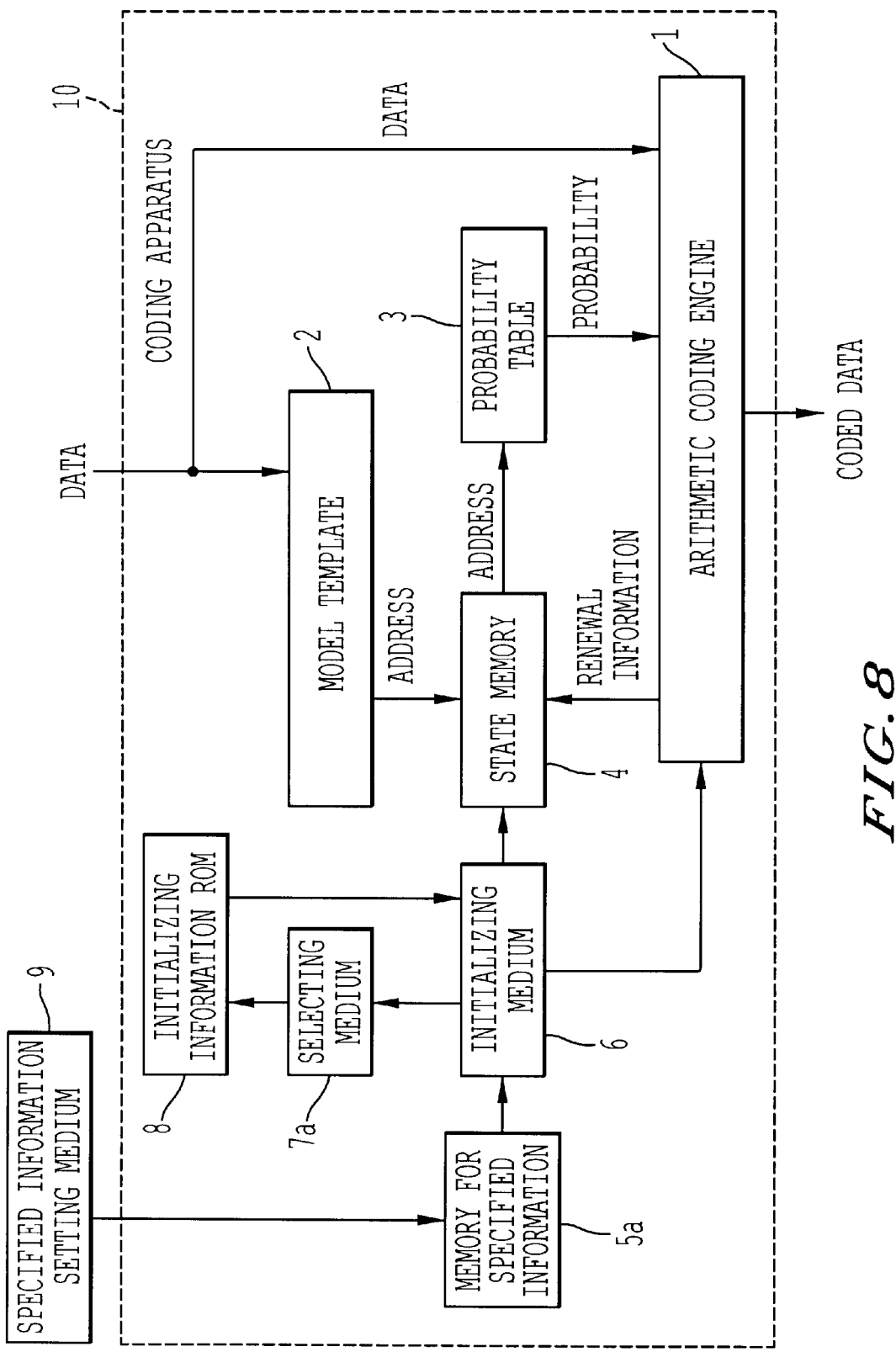
FIG. 8 is a structural block diagram of the coding apparatus of a fifth embodiment according to the present invention.

A fifth embodiment of the present invention is described hereinafter. FIG. 8 is a structural block diagram illustrating a coding apparatus of the fifth embodiment.

As shown in FIG. 8, the coding apparatus of the fifth embodiment is further provided with an initialized information ROM 8 in addition to the structural elements of the fourth embodiment as shown in FIG. 7. For instance, some of the probability values of large white probability are extracted, and the address in which the above appearance probability is stored is previously written into the above-mentioned ROM 8 as the initial value, i.e., the initial address.

The coding apparatus of the fifth embodiment of FIG. 8 is further provided with a selecting medium 7a for selecting one of the above-mentioned plural initial values.

Using the apparatus with such a structure, the operator inputs the specified information by use of the specified information setting medium 8 prior to the coding and decoding operations. Thereafter, the system control section 11 acquires the above-mentioned specified information and sets the information thus acquired to the specified information memory 5a. Thereafter, when the coding operation and the decoding operation are started, the initializing medium 6 acquires the above-mentioned specified information previously set in the specified information memory 5a, and further acquires the initial value previously written in the memory corresponding the above-mentioned specified information from the initialized information ROM 8. The initializing medium 6 practices the initialization as illustrated in the first embodiment. In such a state, the coding and decoding operations can be executed.

Sixth Embodiment

Figure 9:
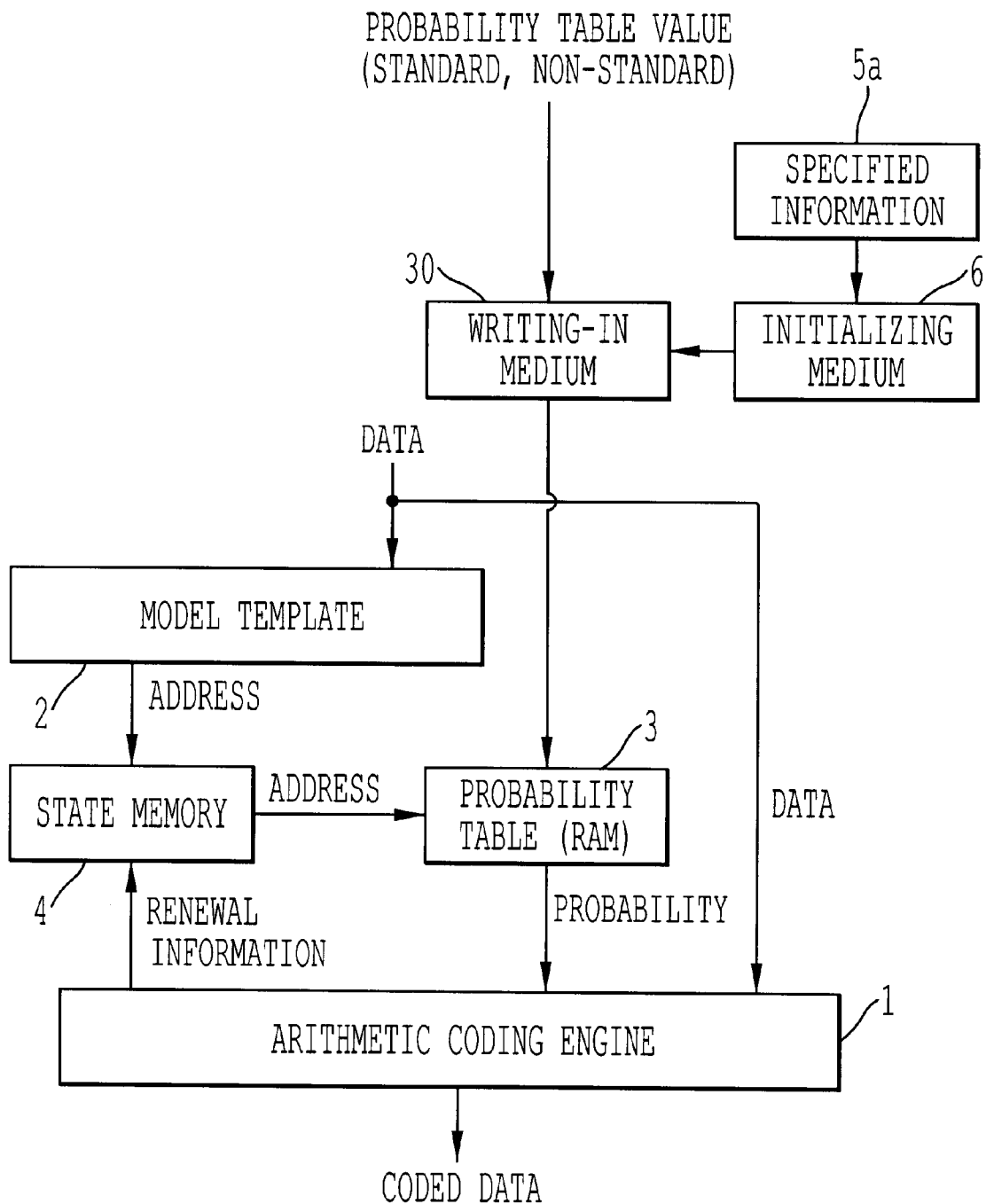
FIG. 9 is a structural block diagram of the coding apparatus of a sixth embodiment according to the present invention.

A sixth embodiment of the present invention is described hereinafter. FIG. 9 is a structural block diagram illustrating a coding apparatus of the sixth embodiment.

In FIG. 9, the arrows connecting the respective blocks represent the flows of the respective data, and the coding apparatus of the sixth embodiment is composed of an arithmetic coding engine 1 performing an arithmetic coding operation, a model template 2, a probability table 3 for obtaining the respective appearance probabilities of combination data which are probably extracted by the above-mentioned model template 2, a state memory 4 performing address conversion in accordance with specified information, a specified information memory 5a storing the specified information, and an initializing medium 6 which obtains an initial value on the basis of the above-mentioned specified information and which sets the above initial value thus obtained into the aforementioned probability table 3 through a writing-in medium 30.

Furthermore, the above-mentioned specified information is a not-disclosed key information, for instance an ASCII code row. The probability table 3 and the specified information memory 5 are respectively constructed with, for instance, a ROM, etc.

As is apparent from the foregoing description, the present invention can achieve advantageous superior functional effects as mentioned hereinafter.

According to a first aspect of the present invention, when the coding and decoding operations are started, the initial value at the time of practicing the arithmetic coding operation is set. Therefore, the same data as those before coding cannot be restored at the coding side where the correct initial value is not set. Consequently, a high confidentiality can be obtained. Furthermore, since a secret language or code is not required for keeping the high confidentiality, the high-speed processing can be realized.

According to a second aspect of the present invention, since different initial values can be set per each of respective blocks at the time of coding, the high confidentiality can be obtained.

According to a third aspect of the present invention, since an initial address for addressing the probability storing medium can be set as the initial value at the time of starting the coding and decoding operations, functional effects as described in the first and second aspects can be easily realized by creating the initial address from a password, etc.

According to a fourth aspect of the present invention, since different plural initial addresses can be set as an initial value in accordance with the data extracted by a model template in the third aspect, decipherment or breaking by a third party turns out to be very difficult, and thereby the confidentiality can be further raised.

According to a fifth aspect of the present invention, since an area size register value in the arithmetic coding operation can be set as the initial value at the time of starting the coding and decoding operations, the functional effect of the first or second aspects can be easily realized, as in the case of the third aspect of the present invention.

According to a sixth aspect of the present invention, since one of the initial address for addressing the probability storing medium, the area size register value, or both of them, can be selected at the time of starting the coding and decoding operations, and the value thus selected can be set as the initial value, the functional effect of the first aspect, etc. can be realized by a suitable method in accordance with the circumstances. In addition, in the operation of selecting both of them as the initial value, the confidentiality can be further raised.

According to a seventh aspect of the invention, since an operator can input and set the specified information in the first or second aspect, only the user knowing the specified information can set the correct specified information. Consequently, the confidentiality can be further raised.

According to an eighth aspect of the invention, since one of the plural initial values can be set in accordance with the specified information input by the operator in the seventh aspect, the initial address can be set so as to correspond to the specified information such that appearance probability as obtained when the learning advances in accordance with the contents of the document to be coded. Thereby, the data compressing ratio can be raised from the first time of coding and the functional effect same as that of the first aspect can be obtained.

This document is based on Japanese Patent Application No. JPAP10-210,403 filed on Jul. 9, 1998, and another Japanese Patent Application No. JPAP 10-347,844, filed on Nov. 20, 1998, the entire contents of both of which are herein incorporated by reference.

The first through fifth embodiments of the present invention have been described heretofore. However, obviously, other numerous embodiments or numerous modifications or variations of the present invention are possible in light of the above teachings. It is therefore to be understood that, within the scope of the appended claims, the present invention may be practiced otherwise than as specifically described herein.

What is claimed is:

1. A coding apparatus comprising:
an arithmetic coding medium configured to arithmetically code data and including a probability storing medium stored in a memory; and
an initial value setting medium configured to set an initial value at a time of performing the arithmetic coding, and including a state memory for performing address conversion to address the probability storing medium based on the set initial value,
wherein said coding apparatus is constructed such that, when a coding operation is started, said initial value is set by said initial value setting medium.

2. A coding apparatus as defined in claim 1,
wherein said initial value setting medium is configured such that different initial values are respectively set per each of block of the data at the time of performing the arithmetic coding.

3. A coding apparatus as defined in claim 1,
wherein said initial value set by said initial value setting medium is an initial address to address the probability storing medium to be referenced at the time of performing the arithmetic coding.

4. A coding apparatus as defined in claim 2,
wherein said initial value set by said initial value setting medium is an initial address to address the probability storing medium to be referenced at the time of performing the arithmetic coding.

5. A coding apparatus as defined in claim 3,
wherein said initial addresses to address said probability storing medium includes different plural addresses in accordance with data extracted by a model template.

6. A coding apparatus as defined in claim 4,
wherein said initial addresses to address said probability storing medium includes different plural addresses in accordance with data extracted by a model template.

7. A coding apparatus as defined in claim 1,
wherein said initial value set by said initial value setting medium is an area size register value in the arithmetic coding.

8. A coding apparatus as defined in claim 2,
wherein said initial value set by said initial value setting medium is an area size register value in the arithmetic coding.

9. A coding apparatus as defined in claim 1,
wherein said coding apparatus is configured such that at least one of said initial address to address said probability storing medium and an area size register value in the arithmetic coding is selected as the initial value set by said initial value setting medium.

10. A coding apparatus as defined in claim 2,
wherein said coding apparatus is constructed such that at least one of said initial address to address said probability storing medium and an area size register value in the arithmetic coding is selected as the initial value set by said initial value setting medium.

11. A coding apparatus as defined in claim 1,
wherein said probability storing medium is a probability table in said arithmetic coding medium stored in a RAM; and
wherein said probability table is down-loaded in a probability table RAM internal to a coding unit from external of said coding unit at a time of initializing said coding unit by use of said initial value setting medium.

12. A coding apparatus as defined in claim 2,
wherein said probability storing medium is a probability table in said arithmetic coding medium stored in a RAM; and
wherein said probability table is down-loaded in a probability table RAM internal to a coding unit from external of said coding unit at a time of initializing said coding unit by use of said initial value setting medium.

13. A coding apparatus as defined in claim 11,
wherein said probability table prepares a standard table and a non-standard table and selects one of the standard and non-standard tables in accordance with contents of a specified information.

14. A coding apparatus as defined in claim 12,
wherein said probability table prepares a standard table and a non-standard table and selects one of the standard and non-standard tables in accordance with contents of a specified information.

15. A coding apparatus as defined in claim 11,
wherein said probability table prepares a standard table and a plural non-standard tables and selects one of the standard and non-standard tables in accordance with contents of a specified information.

16. A coding apparatus as defined in claim 12,
wherein said probability table prepares a standard table and plural non-standard tables and selects one of the standard and non-standard tables in accordance with contents of a specified information.

17. A coding apparatus as defined in claim 13,
wherein said probability table changes only a part of said standard table in accordance with the contents of said specified information, and said non-standard table is obtained thereby.

18. A coding apparatus as defined in claim 14,
wherein said probability table changes only a part of said standard table in accordance with the consents of said specified information, and said non-standard table is obtained thereby.

19. An information processing apparatus provided with a coding apparatus,
wherein said coding apparatus comprises an arithmetic coding medium configured to arithmetically code data and including a probability storing medium stored in a memory, and an initial value setting medium configured to set an initial value at a time of performing the arithmetic coding, and including a state memory for performing address conversion to address the probability storing medium based on the set initial value;

wherein said coding apparatus is constructed such that, when the coding operation is started, said initial value is set by said initial value setting medium; and wherein said information processing apparatus includes a specified information setting medium to input and set specified information.

20. An information processing apparatus as defined in claim 19, wherein said information processing apparatus is constructed such that one of plural initial values is set in accordance with the specified information.

21. A coding apparatus comprising:

arithmetic coding means for arithmetically coding data and including a probability storing means stored in a memory; and initial value setting means for setting an initial value at a time of performing the arithmetic coding, and including an address conversion means for performing address conversion to address the probability storing means based on the set initial value, wherein said coding apparatus is constructed such that, when a coding operation is started, said initial value is set by said initial value setting means.

22. A coding apparatus as defined in claim 21, wherein said initial value setting means is constructed such that different initial values are respectively set per each of blocks of the data at the time of performing the arithmetic coding.

23. A coding apparatus as defined in claim 21, wherein said initial value set by said initial value setting means is an initial address to address a probability storing medium to be referenced at the time of performing the arithmetic coding.

24. A coding apparatus as defined in claim 22, wherein said initial value set by said initial value setting medium is an initial address for addressing probability storing means referenced at the time of performing the arithmetic coding.

25. A coding apparatus as defined in claim 23, wherein said initial addresses to address said probability storing means includes different plural addresses in accordance with data extracted by a model template.

26. A coding apparatus as defined in claim 24, wherein said initial addresses to address said probability storing means are different plural addresses in accordance with data extracted by a model template.

27. A coding apparatus as defined in claim 21, wherein said initial value set by said initial value setting means is an area size register value in the arithmetic coding.

28. A coding apparatus as defined in claim 22, wherein said initial value set by said initial value setting means is an area size register value in the arithmetic coding.

29. A coding apparatus as defined in claim 21, wherein said coding apparatus is constructed such that at least one of said initial address to address said probability storing means and an area size register value in the arithmetic coding is selected as the initial value set by said initial value setting means.

30. A coding apparatus as defined in claim 22, wherein said coding apparatus is constructed such that at least one of said initial address to address said probability storing means and an area size register value in the arithmetic coding is selected as the initial value set by said initial value setting means.

31. A coding apparatus as defined in claim 21, wherein said probability storing means is a probability table in said arithmetic coding means stored in a RAM; and wherein said probability table is down-loaded in a probability table RAM internal to a coding unit from external of said coding unit at a time of initializing said coding unit by use of said initial value setting means.

32. A coding apparatus as defined in claim 22, wherein said probability storing means is a probability table in said arithmetic coding means stored in a RAM; and wherein said probability table is down-loaded in a probability table RAM internal to a coding unit from external of said coding unit at a time of initializing said coding unit by use of said initial value setting means.

33. A coding apparatus as defined in claim 31, wherein said probability table prepares a standard table and non-standard table and selects one of the standard and non-standard tables in accordance with contents of a specified information.

34. A coding apparatus as defined in claim 32, wherein said probability table prepares a standard table and a non-standard table and selects one of the standard and non-standard tables in accordance with contents of a specified information.

35. A coding apparatus as defined in claim 31, wherein said probability table prepares a standard table and plural non-standard tables and selects one of the standard and non-standard tables in accordance with contents of a specified information.

36. A coding apparatus as defined in claim 32, wherein said probability table prepares a standard table and plural non-standard tables and selects one of the standard and non-standard tables in accordance with contents of a specified information.

37. A coding apparatus as defined in claim 33, wherein said probability table changes only a part of said standard table in accordance with contents of said specified information, and said non-standard table is obtained thereby.

38. A coding apparatus as defined in claim 34, wherein said probability table changes only a part of said standard table in accordance with contents of said specified information, and said non-standard table is obtained thereby.

39. An information processing apparatus provided with a coding apparatus, wherein said coding apparatus comprises arithmetic coding means for arithmetically coding data, and including a probability storing means stored in a memory, and initial value setting means for setting an initial value at a time of performing the arithmetic coding, and including a state memory for performing address conversion to address the probability storing means based on the set initial value, wherein said coding apparatus is configured such that, when the coding operation is started, said initial value is set by said initial value setting means, and wherein said information processing apparatus includes specified information setting means for inputting and setting specified information.

40. An information processing apparatus as defined in claim 39,
wherein said information processing apparatus is constructed such that one of plural initial values is set in accordance with the specified information.

41. A method of coding, comprising the steps of:
arithmetically coding data by use of an arithmetic coding medium and including a probability storing medium stored in a memory;
starting a coding operation; and
setting an initial value by use of an initial value setting medium at a time of performing the arithmetic coding by accessing a state memory for performing address conversion to address the probability storing medium based on the set initial value.

42. A method of coding as defined in claim 41, further comprising the step of:
respectively setting different initial values per each of blocks of data at the time of performing the coding by use of said initial value setting medium.

43. A method of coding as defined in claim 41, further comprising the step of:
setting said initial value by said initial value setting medium as an initial address to address said probability storing medium at the time of performing the arithmetic coding.

44. A method of coding as defined in claim 43, further comprising the step of:
addressing said probability storing medium by said at initial addresses as different plural addresses in accordance with data extracted by a model template.

45. A method of coding as defined in claim 41, further comprising the step of:
setting said initial value by said initial value setting medium as an area size register value in the arithmetic coding.

46. A method of coding as defined in claim 41, further comprising the step of:
selecting at least one of said initial address for addressing said probability storing medium and said area size register value in the arithmetic coding as the initial value set by said initial value setting medium.

47. A coding apparatus comprising:
an arithmetic coding medium configured to arithmetically code data; and
an initial value setting medium configured to set an initial value at a time of performing the arithmetic coding,
wherein said coding apparatus is constructed such that, when a coding operation is started, said initial value is set by said initial value setting medium,
wherein a probability table in said arithmetic coding medium is stored in a RAM; and
wherein said probability table is down-loaded in a probability table RAM internal to a coding unit from external of said coding unit at a time of initializing said coding unit by use of said initial value setting medium, and
wherein said probability table prepares a standard table and a non-standard table and selects one of the standard and non-standard tables in accordance with contents of a specified information.

48. A coding apparatus as defined in claim 47,
wherein said initial value setting medium is configured such that different initial values are respectively set per each of block of the data at the time of performing the arithmetic coding.

49. A coding apparatus as defined in claim 47,
wherein said initial value set by said initial value setting medium is an initial address to address said probability storing medium to be referenced at the time of performing the arithmetic coding.

50. A coding apparatus as defined in claim 48,
wherein said initial value set by said initial value setting medium is an initial address to address said probability storing medium to be referenced at the time of performing the arithmetic coding.

51. A coding apparatus as defined in claim 49,
wherein said initial addresses to address said probability storing medium includes different plural addresses in accordance with data extracted by a model template.

52. A coding apparatus as defined in claim 50,
wherein said initial addresses to address said probability storing medium includes different plural addresses in accordance with data extracted by a model template.

53. A coding apparatus as defined in claim 47,
wherein said initial value set by said initial value setting medium is an area size register value in the arithmetic coding.

54. A coding apparatus as defined in claim 48,
wherein said initial value set by said initial value setting medium is an area size register value in the arithmetic coding.

55. A coding apparatus as defined in claim 47,
wherein said coding apparatus is configured such that at least one of said initial address to address said probability storing medium and an area size register value in the arithmetic coding is selected as the initial value set by said initial value setting medium.

56. A coding apparatus as defined in claim 48,
wherein said coding apparatus is constructed such that at least one of said initial address to address said probability storing medium and an area size register value in the arithmetic coding is selected as the initial value set by said initial value setting medium.

57. A coding apparatus as defined in claim 47,
wherein said probability table changes only a part of said standard table in accordance with the contents of said specified information, and said non-standard table is obtained thereby.

58. A coding apparatus comprising:
arithmetic coding means for arithmetically coding data; and
initial value setting means for setting an initial value at a time of performing the arithmetic coding, wherein said coding apparatus is constructed such that, when a coding operation is started, said initial value is set by said initial value setting means,
wherein a probability table in said arithmetic coding means is stored in a RAM,
wherein said probability table is down-loaded in a probability table RAM internal to a coding unit from external of said coding unit at a time of initializing said coding unit by use of said initial value setting means, and
wherein said probability table prepares a standard table and non-standard table and selects one of the standard and non-standard tables in accordance with contents of a specified information.

59. A coding apparatus as defined in claim 58, wherein said initial value setting means is constructed such that different initial values are respectively set per each of blocks of the data at the time of performing the arithmetic coding.

60. A coding apparatus as defined in claim 58, wherein said initial value set by said initial value setting means is an initial address to address said probability table to be referenced at the time of performing the arithmetic coding.

61. A coding apparatus as defined in claim 59, wherein said initial value set by said initial value setting medium is an initial address for addressing said probability table referenced at the time of performing the arithmetic coding.

62. A coding apparatus as defined in claim 60, wherein said initial addresses to address said probability table includes different plural addresses in accordance with data extracted by a model template.

63. A coding apparatus as defined in claim 61, wherein said initial addresses to address said probability table are different plural addresses in accordance with data extracted by a model template.

64. A coding apparatus as defined in claim 58, wherein said initial value set by said initial value setting means is an area size register value in the arithmetic coding.

65. A coding apparatus as defined in claim 59, wherein said initial value set by said initial value setting means is an area size register value in the arithmetic coding.

66. A coding apparatus as defined in claim 58, wherein said coding apparatus is constructed such that at least one of said initial address to address said probability table and an area size register value in the arithmetic coding is selected as the initial value set by said initial value setting means.

67. A coding apparatus as defined in claim 59, wherein said coding apparatus is constructed such that at least one of said initial address to address said probability table and an area size register value in the arithmetic coding is selected as the initial value set by said initial value setting means.

68. A coding apparatus as defined in claim 58, wherein said probability table changes only a part of said standard table in accordance with contents of said specified information, and said non-standard table is obtained thereby.

\* \* \* \* \*